United States Patent
Petrovicky et al.

(10) Patent No.: US 8,631,346 B2
(45) Date of Patent: Jan. 14, 2014

(54) FILE CONVERSION INITIATED BY RENAMING OF FILE EXTENSION

(75) Inventors: Lukas Petrovicky, Most (CZ); Jiri Pechanac, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 413 days.

(21) Appl. No.: 12/778,780

(22) Filed: May 12, 2010

(65) Prior Publication Data

US 2011/0283229 A1 Nov. 17, 2011

(51) Int. Cl.
*G06F 3/048* (2013.01)
*G06F 17/30* (2006.01)

(52) U.S. Cl.
USPC ............................ 715/809; 707/E17.006

(58) Field of Classification Search
USPC ............................ 715/809; 707/E17.006
See application file for complete search history.

(56) References Cited

U.S. PATENT DOCUMENTS

| | | | |
|---|---|---|---|
| 6,260,043 B1 * | 7/2001 | Puri et al. ............................. | 1/1 |
| 6,385,606 B2 * | 5/2002 | Inohara et al. ................ | 707/702 |
| 6,662,186 B1 * | 12/2003 | Esquibel et al. ....................... | 1/1 |
| 7,119,267 B2 * | 10/2006 | Hirade et al. .................. | 84/602 |
| 7,792,881 B2 * | 9/2010 | Forstall et al. ................ | 707/822 |
| 2001/0037338 A1 * | 11/2001 | Stockley ....................... | 707/101 |
| 2003/0130999 A1 * | 7/2003 | Probert et al. .................... | 707/3 |
| 2007/0100834 A1 * | 5/2007 | Landry et al. ................... | 707/10 |
| 2007/0230920 A1 * | 10/2007 | Gasper .......................... | 386/112 |
| 2008/0243892 A1 * | 10/2008 | Little et al. .................... | 707/101 |
| 2008/0281874 A1 * | 11/2008 | Koga ............................. | 707/200 |
| 2010/0122313 A1 * | 5/2010 | Ivgi ................................... | 726/1 |
| 2010/0306175 A1 * | 12/2010 | Johnson et al. ............... | 707/663 |
| 2011/0313982 A1 * | 12/2011 | Kranendonk et al. ........ | 707/702 |

OTHER PUBLICATIONS

Fehily, Chris, Visual QuickStart Guide: Microsoft Windows 7, Sep. 8, 2009, Peachpit Press, ISBN-13: 978-0-321-64686-6, pp. 51, 201, 206-209, 268-269, 272-273, & 297.*

ImageMagick, "ImageMagick v6 Examples and ImageMagick Formats", Apr. 30, 2009, retrieved from the internet archive on Jan. 17, 2013, from web/20090430211205/http://www.imagemagick.org/Usage/basics/ and web/209043022809/http://imagemagick.org/script/format, pp. 1 to 8 of 35 and 1 to 8 of 12, respectively.*

* cited by examiner

*Primary Examiner* — Doon Chow
*Assistant Examiner* — Wilson Varga
(74) *Attorney, Agent, or Firm* — Lowenstein Sandler LLP

(57) ABSTRACT

Some embodiments of a system and a method to process file conversion initiated by natural human behavior have been presented. For instance, a file conversion manager running on a processing device may intercept an operation invoked by a user to rename at least a first extension of a file name of a file having an original file format to a second extension associated with a target file format. In response to the operation, the file conversion manager may select and execute one of a group of third party file conversion applications to convert the file from the original file format to the target file format.

18 Claims, 4 Drawing Sheets

FILE CONVERSION INITIATED BY RENAMING OF FILE EXTENSION

TECHNICAL FIELD

Embodiments of the present invention relate to managing files in a computing system, and more specifically to processing file conversion initiated by natural human behavior.

BACKGROUND

Conventionally, users of computing system typically have to work with documents in many different formats. In general, each format is associated with a distinct file extension. Frequently, a document has to be converted from one format to another format. Currently, to properly convert file format of a file, a user has to open the file to be converted and export the data into the target format. In some conventional computing systems, a user has to use command line based conversion tools or tools integrated with desktop environment on the level of right-click menu, where the user can get an option to convert the file.

However, for many novice computer users, the above conventional tools are too complicated to use, and they may not even be aware of such tools. Rather than invoking the appropriate tool to properly convert a file from one format to another, many novice users simply rename the file extension of a file, mistakenly believing that extension renaming could convert the file format of the file.

BRIEF DESCRIPTION OF THE DRAWINGS

The present invention is illustrated by way of example, and not by way of limitation, in the figures of the accompanying drawings and in which.

DETAILED DESCRIPTION

Figure 1:
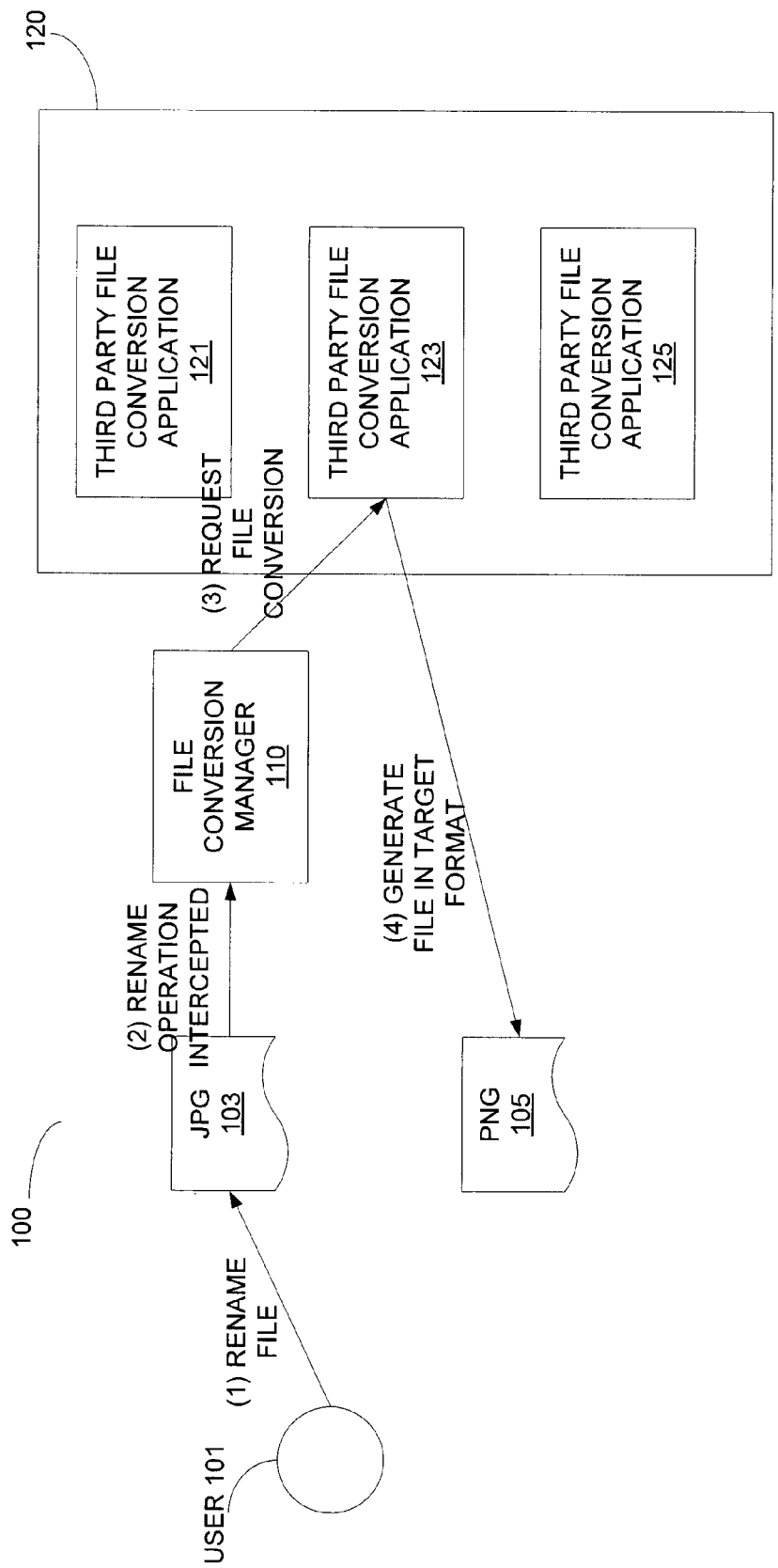
FIG. 1 illustrates a workflow diagram of file conversion initiated by natural human behavior according to some embodiments of the invention.

Described herein are some embodiments of a method, an apparatus, and a system to process file conversion initiated by natural human behavior. As used herein, a file broadly refers to a set of electronic data embodied in one or more computer-readable storage media. A file can be stored in various formats, depending on the nature of the data. For example, textual data can be stored in word processing formats (e.g., Open Text format, Microsoft Word format, etc.), portable document format (PDF), text format, etc. Data of a still image can be stored in bitmap, Joint Photographic Expert Group (JPEG), etc. In some embodiments, a file conversion manager running on a processing device may intercept an operation invoked by a user to rename at least a first extension of a file name of a file having an original file format to a second extension associated with a target file format. In response to the operation, the file conversion manager may select and execute one of a group of third party file conversion applications to convert the file from the original file format to the target file format. By recognizing file extension renaming being a typical way in which many computer users attempt to convert the format of a file, albeit not the correct way, the above approach seamlessly puts the user back on the proper track to convert the file format correctly without requiring the user to learn the use any file conversion tool. In other words, detection of some common natural human behavior frequently associated with a particular data manipulation can trigger a file managing application running on the computer to perform the particular data manipulation according to some embodiments of the invention. Details of some embodiments of how to process file conversion initiated by natural human behavior are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "intercepting" or "executing" or "generating" or "selecting" or "registering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
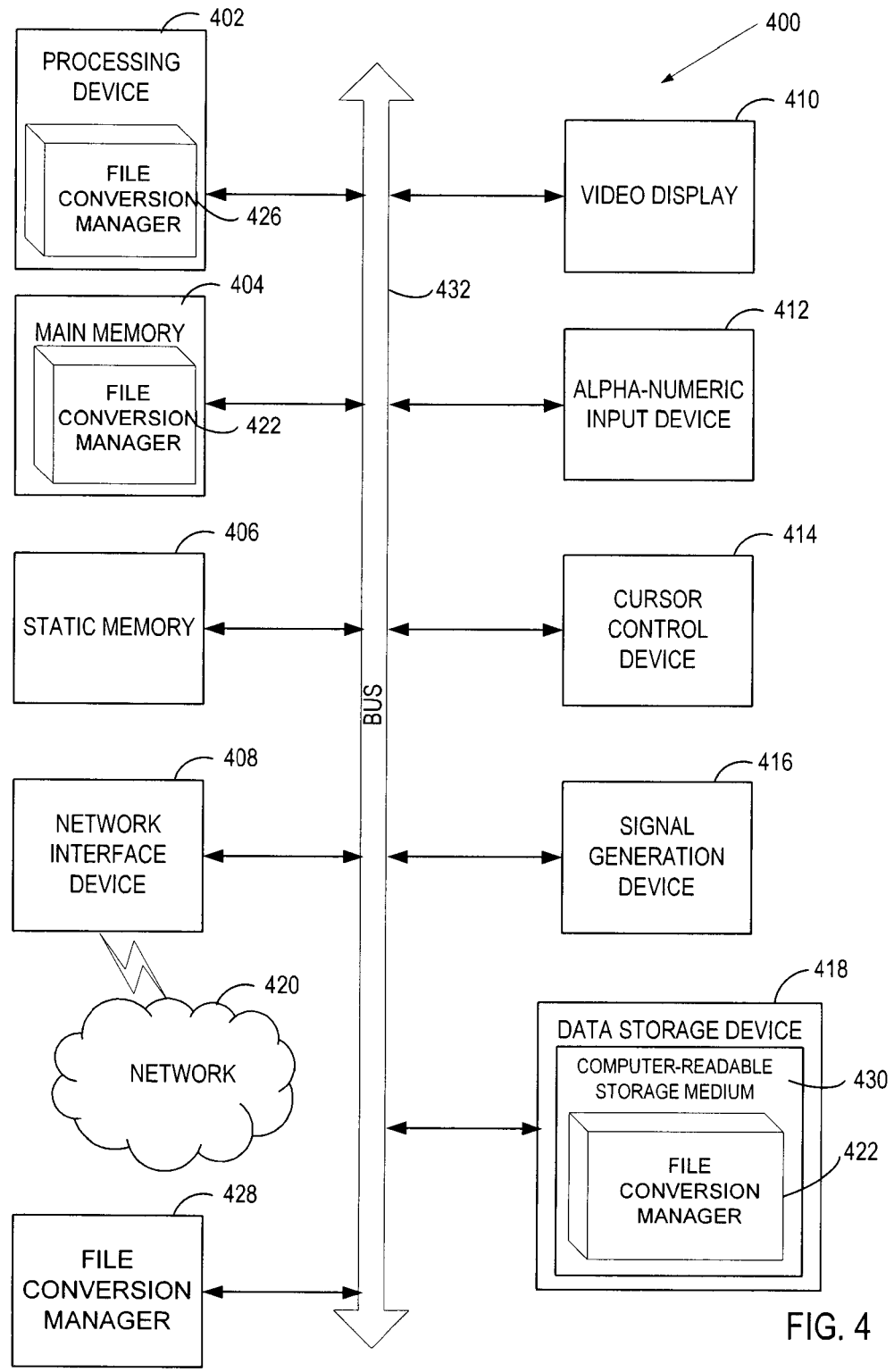
FIG. 4 illustrates a block diagram of an exemplary computing system.

FIG. 1 illustrates a workflow diagram of file conversion initiated by natural human behavior according to some embodiments of the invention. The system 100 includes a file conversion manager 110 and a repository 120 storing a set of third party file conversion applications 121, 123, and 125. All or part of the system 100 may be implemented on one or more computing machines, such as a server, a desktop personal computer, a laptop computer, a personal digital assistant, etc. Details of one example of a computing machine are illustrated in FIG. 4.

In some embodiments, the third party file conversion applications 121, 123, and 125 may be registered with the file conversion manager 110 upon installation. To register with the file conversion manager 110, a third party file conversion application (e.g., third party file conversion applications 121, 123, and 125) may describe how it initiates file conversion. The third party file conversion applications 121, 123, and 125 may initiate and execute file conversion in various ways. For example, Component Object Model (COM) automation may be used in systems running Windows Operating System (OS) or a similar OS. Alternatively, a third party file conversion application may invoke a command line interface or a graphical user interface with proper arguments to execute the file conversion. In another embodiment, a third party file conversion application may provide a location of an external service (or remote service) that can perform the file conversion and return a converted file. Alternatively, the file conversion manager 110 may define an interface to which a third party file conversion application has to conform to expose such functionality. By registering the third party file conversion applications 121, 123, and 125, the file conversion manager 110 can keep track of which input and output file formats are supported by the third party file applications 121, 123, and 125.

Furthermore, a user or an administrator of the system 100 may configure the file conversion manager 110 to select and execute a certain third party file conversion manager in a particular situation. For example, suppose both applications 121 and 125 support conversion of Open Text documents to PDF files. An administrator of the system 100 may prefer application 121 over application 125, and thus, configure the file conversion manager 110 to select application 121 rather than 125 when a user initiates conversion of an Open Text document into a PDF file. The third party file conversion applications 121, 123, and 125 may be stored in the repository 120 within the system 100. The file conversion manager 110 may later access the repository 120 to retrieve one of the third party file conversion applications 121, 123, and 125. To illustrate the operations of the file conversion manager 110, one example is discussed in details below.

In some embodiments, a user 101 initiates an operation that involves renaming an extension of a file (1). In many cases, it is observed that users, especially novice users, simply rename an extension of a file when attempting to convert the format of the file. In other words, it is natural behavior of many users to rename the file extension when attempting to convert the format of the file. In the current example, the file 103 has an original extension of "jpg," which is associated with the graphic file format, JPEG format. Some examples of the operation include rename, copy, move, etc. The file conversion manager 110 detects the user operation, and intercepts it (2). Optionally, the file conversion manager 110 may generate a user interface (e.g., a dialog box) to seek confirmation from the user 101 on the file conversion to be performed. By requesting the user 101 to confirm the file conversion, the file conversion manager 110 may explicitly notify the user 101 of the conversion of the file format of the file 103, and hence, avoiding potential user confusion or misunderstanding over the effect or outcome of the user operation intercepted.

After intercepting the user operation, the file conversion manager 110 checks the user operation to determine the original file extension (which is "jpg" in the current example) and the target file extension (which is "png" in the current example). Based on the original and target file extensions, the file conversion manager 110 selects an appropriate third party file conversion application from the repository 120. Suppose the third party file conversion application 123 converts JPEG files into Portable Network Graphics (PNG) files. Then the file conversion manager 110 may select the third party file conversion application 123, which supports an input format of JPEG and an output format of PNG. Then the file conversion manager 110 requests the third party file conversion application 123 to convert the file 103 into PNG format (3). In response to the request, the third party file conversion application 123 converts the file 103 into file 105, which is in PNG format (4).

By recognizing the natural way in which many users of computing systems attempt to convert file formats, the above approach provides a user-friendly user interface to help users to convert file formats. Unlike in some conventional systems, users do not need to open a file, and then export the file in a target format in order to convert the format of the file. In addition, the above approach helps novice users of computing systems to properly convert file formats. Because novice users often mistakenly believe that changing the extension of a file could properly convert the format of the file, the above file conversion mechanism can invoke an appropriate third party file conversion application to properly convert the file even though the novice users may not even know which file conversion application to use and/or how to invoke the appropriate file conversion application.

Figure 2:
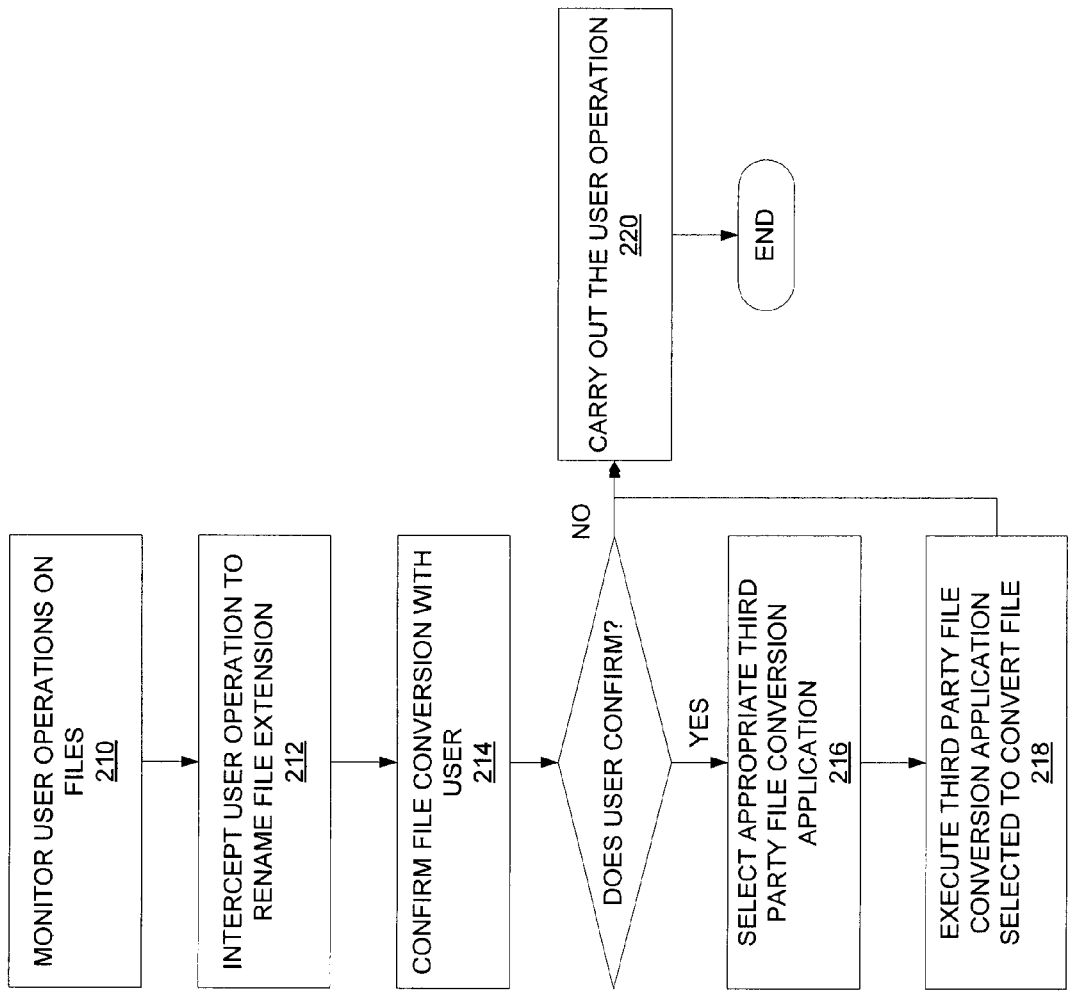
FIG. 2 illustrates a flowchart of one embodiment of a method to convert a file.

FIG. 2 illustrates a flow diagram of one embodiment of a method to convert a file. The method may be performed by processing logic that may comprise hardware (e.g., circuitry, dedicated logic, programmable logic, microcode, etc.), software (such as instructions run on a processing device), firmware, or a combination thereof. For instance, the file conversion manager 110 illustrated in FIG. 1 may perform at least part of the method in some embodiments.

Initially, processing logic monitors user operations on files stored in a computing system (processing block 210). Then processing logic intercepts a user operation to rename a file extension of a file from an original extension to a target extension (processing block 212). For example, processing logic may intercept a user operation to copy an original file with an extension ".doc" to a target file with an extension "pdf." Then processing logic may optionally confirm with the user that he or she intends to convert the original file from an original file format associated with the original extension into a target file format associated with the target extension (processing block 214). If confirmed, processing logic may select an appropriate third party file conversion application that converts files in the original file format into the target format (processing block 216). Next, processing logic executes the third party file conversion application selected to convert the file for the user (processing block 218) and then transitions to processing block 220. If not confirmed, processing logic transitions to processing block 220 to carry out the user operation (processing block 220), and then the method ends.

Figure 3:
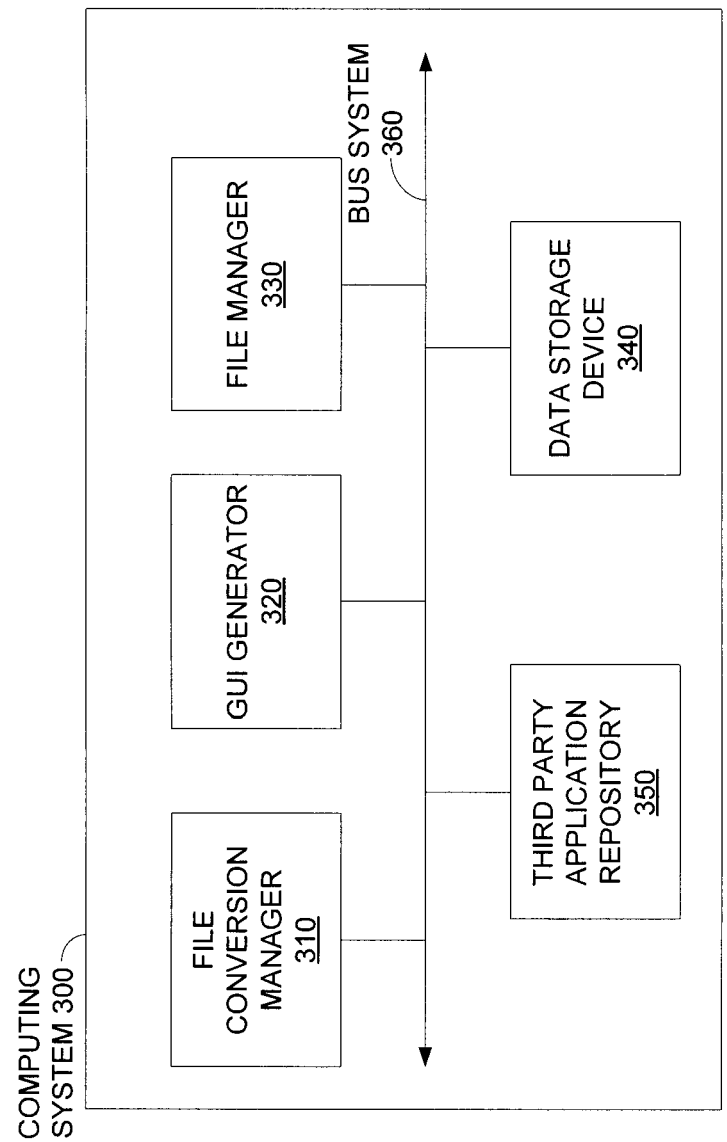
FIG. 3 illustrates a functional block diagram of one embodiment of a computing system usable to convert files.

FIG. 3 illustrates a functional block diagram of one embodiment of a computing system usable to convert files. The computing system may be implemented with a server, a personal computer, a laptop computer, a personal digital assistant (PDA), a smart phone, etc. In some embodiments, the computing system 300 includes a file conversion manager 310, a graphical user interface (GUI) generator 320, a file manager 330, a third party application repository 350, and a data storage device 340, interconnected to each other via a bus system 360.

In some embodiments, the third party application repository 350 stores a set of third party applications, some of which support file format conversion. The data storage device 340 stores data files of various types. Furthermore, data files of the same type may be stored in different formats. For example, files containing static graphic images may be stored in PNG format, JPEG format, bitmap format, etc. Typically, each file format is associated with a distinct file extension. The file manager 330 manages and organizes the files. Users of the computing system 300 may invoke various user operations via the file manager 330. Some user operations involve changing the extension of a file. As discussed above, it is a natural way for users, especially novice users, to attempt to convert a file from one format to another format by changing the extension of the file. Thus, the file conversion manager 310 monitors user operations and intercepts those that involve changing file extensions.

After intercepting the user operation, the file conversion manager 310 determines an original file format associated with the original extension and a target file format associated with the target extension. Based on the original file format and the target file format, the file conversion manager 310 selects and retrieves an appropriate third party file conversion application from the third party application repository 350. The file conversion manager 310 then executes the third party file conversion application retrieved to convert the file from the original format into the target format. Depending on the user operation invoked, the file conversion manager 310 may or may not overwrite the original file with the converted file. For example, if the user operation is "copy," then the file conversion manager 310 may not overwrite the original file. If the user operation is "rename," then the file conversion manager 310 may overwrite the original file with the converted file.

In some embodiments, the file conversion manager 310 causes the GUI module 320 to generate a GUI in order to confirm with a user when a user operation involving file extension changes is intercepted. For example, the GUI may include a dialog box displaying the original file format and the target file format. The GUI may further include user interface control (e.g., a button) usable by the user to confirm the file conversion before it is performed. By confirming with the user, the file conversion manager 310 avoids mistakenly converting the file into a format not desired by the user.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the file conversion manager 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., file conversion manager 422) embodying any one or more of the methodologies or functions described herein. The file conversion manager 422 may also reside, completely or at least partially, within the main memory 404 and/or within the processing device 402 during execution thereof by the computing system 400, the main memory 404 and the processing device 402 also constituting computer-accessible storage media. The file conversion manager 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The file conversion manager 428, components and other features described herein (for example, in relation to FIG. 1) can be implemented as discrete hardware components or integrated into the functionalities of hardware components, such as ASICS, FPGAs, DSPs, or similar devices. In addition, the file conversion manager 428 can be implemented as firmware or functional circuitries within hardware devices. Further, the file conversion manager 428 can be implemented in any combination of hardware devices and software components.

Thus, some embodiments of a system and a method to process file conversion initiated by natural human behavior have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   intercepting, by a file conversion manager running on a processing device, an operation to rename a first extension of a file name of a file having an original file format to a second extension associated with a target file format, wherein the original file format and the target file format are each one of word processing format, text format, portable document format, bitmap format, Joint Photographic Expert Group (JPEG) format, or Portable Network Graphics (PNG) format, and
   wherein the file having the original file format is in an unopened state;
   in response to the operation to rename the first extension:
      generating, by the file conversion manager, a user interface to receive confirmation to convert the file from the original file format to the target file format;
      executing, by the file conversion manager, a file conversion application to convert the file from the original file format to the target file format; and
      overwriting the file having the original file format with a new file having the target file format.

2. The method of claim 1, further comprising:
   registering, by the file conversion manager, the file conversion application; and
   keeping track of file formats supported by the file conversion application.

3. The method of claim 1, further comprising:
   a plurality of file conversion applications, each of the file conversion applications to convert files from a first file format to a second file format; and
   selecting, by the file conversion manager, one of the plurality of file conversion applications according to prior administrator configuration.

4. The method of claim 3, further comprising:
   selecting, by the file conversion manager, the one of the plurality of file conversion applications based on the first file format and the second file format.

5. The method of claim 1, wherein the original file format is text and the target file format is a portable document format (PDF).

6. The method of claim 1, wherein the file includes still image data.

7. An apparatus comprising:
   a storage device to store a file having an original file format; and
   a processing device coupled to the storage device, to:
      intercept an operation to rename at least a first extension of a file name of the file to a second extension associated with a target file format, wherein the file having the
      original file format is in an unopened state and wherein the original file format and the target file format are each one of word processing format, text format, portable document format, bitmap format, Joint Photographic Expert Group (JPEG) format, or Portable Network Graphics (PNG) format;
      in response to the operation to rename the first extension:
         generate, by the file conversion manager, a user interface to receive confirmation to convert the file from the original file format to the target file format
         execute a file conversion application to convert the file from the original file format to the target file format; and
         overwrite the file having the original file format with a new file having the target file format.

8. The apparatus of claim 7, wherein the processing device registers the file conversion application and keeps track of file formats supported by the file conversion application.

9. The apparatus of claim 7, further comprising:
   a plurality of file conversion applications, each of the file conversion applications to convert files from a first file format to a second file format; and
   wherein the processing device selects one of the plurality of file conversion applications according to prior administrator configuration.

10. The apparatus of claim 9, wherein the processing device selects one of the plurality of file conversion applications based on the first file format and the second file format.

11. The apparatus of claim 7, wherein the original file format is text and the target file format is a portable document format (PDF).

12. The apparatus of claim 7, wherein the file includes still image data.

13. A non-transitory computer-readable storage medium embodying instructions that, when executed by a processing device, causes the processing device to perform operations a method comprising:
   intercepting, by a file conversion manager, an operation to rename a first extension of a file name of a file having an original file format to a second extension associated with a target file format, wherein the file having the original file format is in an unopened state and wherein the original file format and the target file format are each one of word processing format, text format, portable document format, bitmap format, Joint Photographic Expert Group (JPEG) format, or Portable Network Graphics (PNG) format;
   in response to the operation to rename the first extension:
      generating, by the file conversion manager, a user interface to receive confirmation to convert the file from the original file format to the target file format;
      executing a file conversion application to convert the file from the original file format to the target file format; and
      overwriting the file having the original file format with a new file having the target file format.

14. The non-transitory computer-readable storage medium of claim 13, further comprising:
   registering, by the file conversion manager, the plurality of third party file conversion application; and
   keeping track of file formats supported by the file conversion application.

15. The non-transitory computer-readable storage medium of claim 13, further comprising:
   a plurality of file conversion applications, each of the file conversion applications to convert files from a first file format to a second file format; and
   selecting, by the file conversion manager, one of the plurality of third party file conversion applications according to prior administrator configuration.

16. The non-transitory computer-readable storage medium of claim 15, further comprising:
   selecting, by the file conversion manager, one of the plurality of file conversion applications based on the first file format and the second format.

17. The non-transitory computer-readable storage medium of claim 13, wherein the original file format is text and the target file format is a portable document format (PDF).

18. The non-transitory computer-readable storage medium of claim 13, wherein the file includes still image data.

* * * * *